(12) United States Patent
Wall

(10) Patent No.: US 7,560,673 B2
(45) Date of Patent: Jul. 14, 2009

(54) DEVICE FOR SOIL STERILIZATION, INSECT EXTERMINATION, AND WEED KILLING USING MICROWAVE ENERGY

(76) Inventor: George W. Wall, 1086 S. 3rd St., Manchester, IA (US) 52057

( * ) Notice: Subject to any disclaimer, the term of this patent is extended or adjusted under 35 U.S.C. 154(b) by 0 days.

(21) Appl. No.: 11/552,595

(22) Filed: Oct. 25, 2006

(65) Prior Publication Data

US 2008/0149625 A1   Jun. 26, 2008

(51) Int. Cl.
*H05B 6/78* (2006.01)
*A61L 2/12* (2006.01)
*E01C 23/14* (2006.01)

(52) U.S. Cl. .................. 219/700; 219/679; 219/701; 219/710; 219/756; 219/762; 422/21; 404/79

(58) Field of Classification Search ......... 219/700–702, 219/679, 756, 762, 746; 422/21, 22; 404/77, 404/79, 95, 113
See application file for complete search history.

(56) References Cited

U.S. PATENT DOCUMENTS 4,187,946 A    2/1980 Stevenson
4,319,856 A *  3/1982 Jeppson .................. 404/79
4,631,380 A   12/1986 Tran
5,141,059 A    8/1992 Marsh
5,287,818 A    2/1994 Rajamannan
5,607,856 A    3/1997 Moon et al.
6,167,821 B1 * 1/2001 Beggs ................... 111/124
6,183,532 B1   2/2001 Celli
6,319,463 B1  11/2001 Celli
6,347,753 B1   2/2002 Anderson
6,401,637 B1   6/2002 Haller
6,554,531 B2   4/2003 Bodish
6,647,661 B2  11/2003 Grigorov
2003/0215354 A1 11/2003 Clark et al.

FOREIGN PATENT DOCUMENTS

JP    2005-66451   *  3/2005
RU      1807177   *  4/1993

* cited by examiner

*Primary Examiner*—Quang T Van
(74) *Attorney, Agent, or Firm*—Jason R. Sytsma

(57) ABSTRACT

An apparatus for controlling agricultural pests in soil using microwave energy. The apparatus is an agricultural implement having a means for directing a layer of soil from the ground onto a conveyor which carries the soil through a microwave energy application area, and then disperses the soil back onto the ground. The microwave energy heats the soil to a desired temperature which destroys weeds, seeds, and insects in the soil.

1 Claim, 2 Drawing Sheets

DEVICE FOR SOIL STERILIZATION, INSECT EXTERMINATION, AND WEED KILLING USING MICROWAVE ENERGY

BACKGROUND OF THE INVENTION

The present invention relates to agricultural implements. More specifically the present invention relates to an apparatus and method for treating soil using microwave energy.

Agricultural crop production requires preparing a bed of soil prior to planting. The task of properly preparing the soil for planting includes treating the soil to preclude germination of existing seeds, killing weeds prior to sowing seed, and killing insects. To accomplish these preparatory tasks, many farmers use machinery to add chemical pesticides, herbicides and/or insecticide to treat the soil prior to sowing seed. These chemical additives are applied to provide the best possible growth medium for the crop. One problem with chemical additives is that chemicals can damage the environment, especially water supplies. Another problem with chemical additives is that rain can cause the chemicals to run off the field instead of penetrating downward into the soil which leaves some of the existing seeds, weeds, and insects alive to adversely affect crop yield.

Another method for treating soil includes administering heat to the soil. The heat is produced and distributed in various ways to heat the soil up to 80-90 degrees Celsius, which is sufficient to kill the majority of pests present. One specific heat based method employs boiling water to sterilize the soil. This method is expensive and generally only economically practicable under limited circumstances. One method that uses boiling water to sterilize soil is described in U.S. Pat. No. 5,622,123. This patent discloses the use of hot water with soil tilling for penetration, and an insulating foam layer which is placed on the soil surface to retain the heat from the water. In addition to being very expensive, hot water based treatments have many problems. One problem is that they require a mechanically complex apparatus to effect penetration and long hoses between the water heating element and the apparatus for penetrating application to the soil.

Another heat based method for preparing soil includes the use of microwave energy to heat the soil to the appropriate pest destruction temperature. Prior art devices that disclose the use of microwave energy are disclosed in U.S. Pat. Nos. 5,141,059 and 6,401,637, and U.S. patent application Ser. No. 10/245,787. The devices disclosed in these patents emit microwave radiation downward into the soil as they move over the top of the soil. One problem with these devices is that they do not adequately loosen the soil as they emit the microwave energy. Loosening the soil helps to thoroughly treat the soil with the radiation. Another problem with these devices is that it is difficult for the user to determine the depth that the soil being treated.

Therefore, there is a need for an improved farming device which minimizes negative environmental impact while increasing the efficiency and productivity of farming operations.

SUMMARY OF THE INVENTION

The present invention is a device that utilizes microwave energy to destroy weed, plant, and insect cells (collectively sometimes referred to herein as "pests") in soil prior to planting a crop in the soil. In some embodiments, the device uses a ground engaging member to direct soil from the ground onto a conveyor. The conveyor transports the soil through a microwave energy application area where microwave energy is irradiated through the soil by microwave energy generators. The microwave energy heats the soil to a predetermined temperature which destroys weed, plant, and insect cells in the soil. In order to maximize the destruction of pests, the target soil temperature can be varied by changing the amount of energy applied to the soil, the energy frequency emitted, and/or the length of time the energy is applied to the soil. After the soil passes through the microwave energy application area, the conveyor carries the irradiated soil to the rear of the device where it is dispersed back onto the ground. In some embodiments, the apparatus has a portable power source to power the microwave energy generators which includes means to confine the microwave radiation within the area to be treated.

The present invention is beneficial over known devices because it loosens the soil by directing it from the ground onto a conveyor before it is irradiated. This is advantageous because the amount and depth of soil being irradiated on the conveyor is known with certainty. In contrast, it can be difficult to determine the depth to which the microwave radiation penetrates downward into the soil with some prior art devices.

DESCRIPTION OF THE PREFERRED EMBODIMENT OF THE INVENTION

Figure 1:
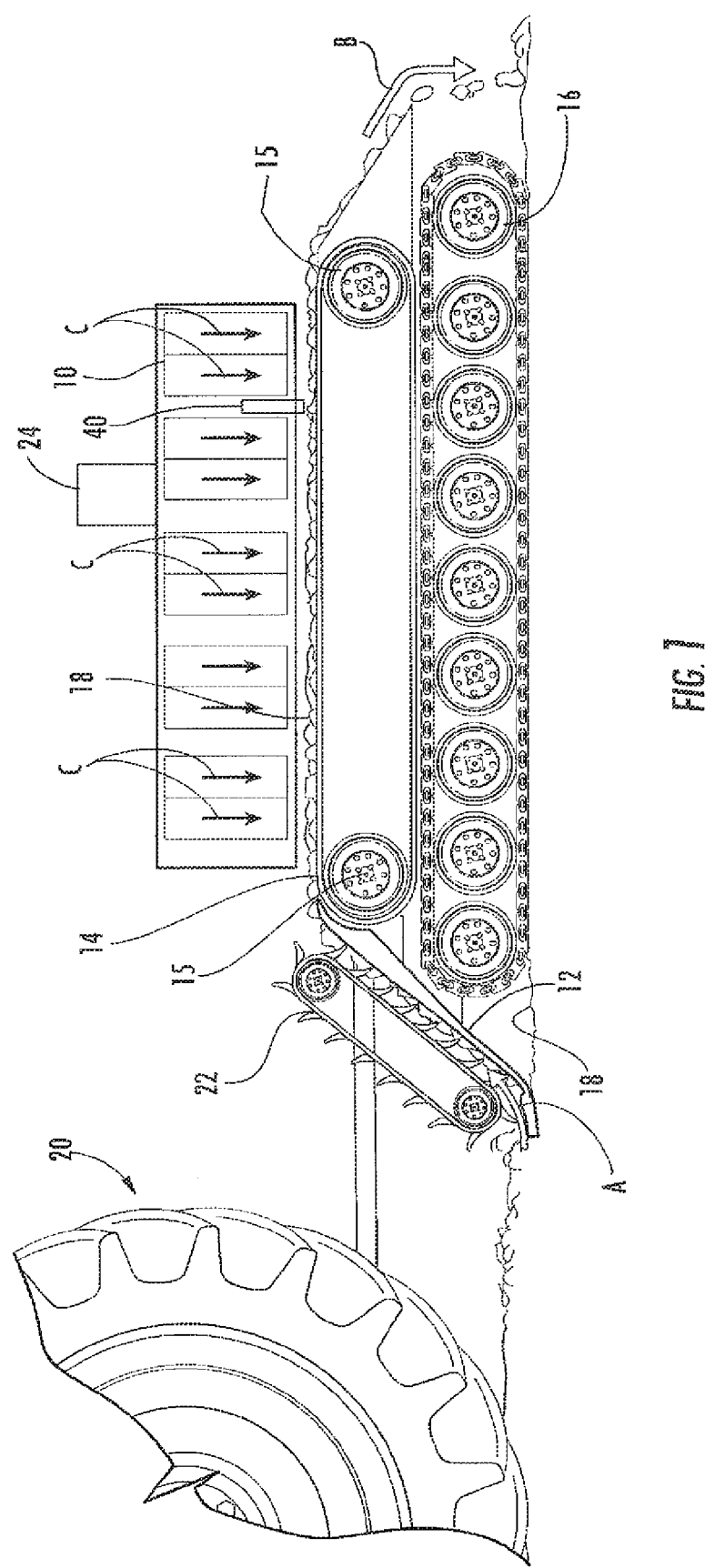
FIG. 1 is a side view of the present invention.

The present invention is a device that utilizes microwave energy to destroy weed, plant, and insect cells (collectively sometimes referred to as "pests") in soil prior to planting crops in the soil. As seen in FIG. 1, the device comprises a frame that preferably rides on an endless track 16 so as to minimize soil compaction, however, in some embodiments the device may ride on conventional tires. Further, as seen in FIG. 1, the device is preferably adapted to be pulled behind a tractor or other primary mover vehicle 20, however, in some embodiments the device may have its own engine so that it is self propelled.

Figure 2:
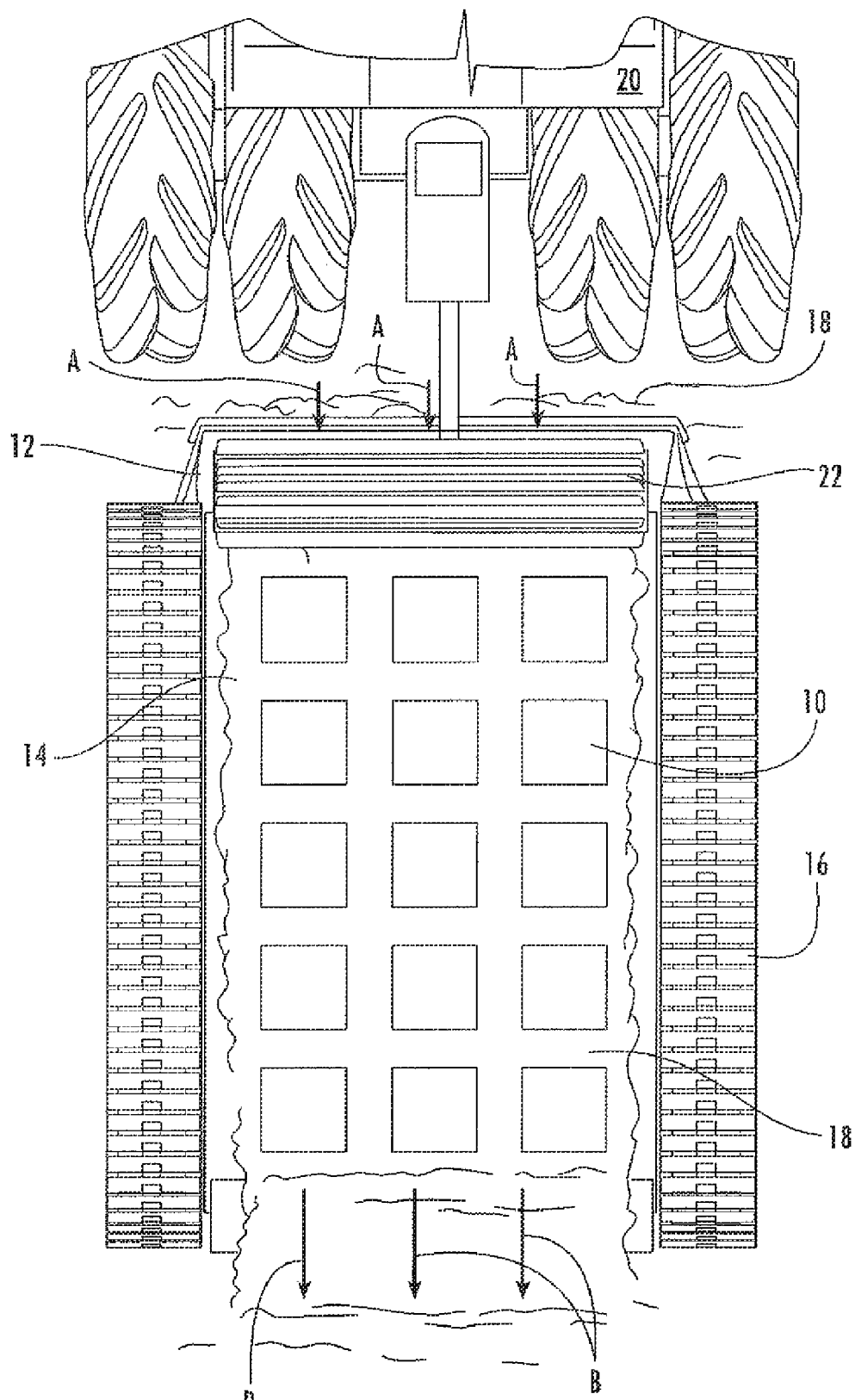
FIG. 2 is a top view of the present invention.

FIGS. 1 and 2 show the preferred embodiment of the device wherein the front of the device comprises a ground engaging member 12 for directing soil 18 from the ground onto a conveyor 14 as shown by arrows A in FIGS. 1 and 2. The ground engaging member 12 is preferably comprised of a blade or plurality of blades that extend a predetermined distance below the surface of the soil 18. The ground engaging member 12 is angled upward so that movement of the member 12 across the ground directs the soil 18 onto the conveyor 14. In an alternate embodiment, a portion of the conveyor 14 is in direct contact with the ground so that the ground engaging member 12 is not needed to direct the soil 18 from the ground onto the conveyor 14.

In some embodiments, the device comprises an assembly 22 to aid in directing the soil 18 from the ground onto the conveyor 14 as shown in FIG. 1. Assembly 22 comprises a plurality of protrusions or paddles that rotate to help direct the soil 18 from the ground onto the conveyor 14. In one embodiment, the protrusions or paddles of assembly 22 extend below the surface of the ground to help break up the soil 18 as it is directed up ground engaging member 12. In an alternate embodiment, a roto-tiller (not shown) may be used instead of or in addition to assembly 22 to aid in breaking up the soil 18 and directing the soil 18 onto conveyor 14.

The depth that the ground engaging member 12 penetrates the soil 18 can be changed to vary the amount and depth of soil 18 directed onto the conveyor 14. The ground engaging member 12 preferably penetrates into the ground between four and eight inches so as to direct that amount of soil 18 onto the conveyor 14. Depending on soil 18 type (e.g. consistency, density, and/or moisture content) and desired soil 18 temperature, it may be necessary to vary the depth of soil 18 directed onto the conveyor 18. For example, if the soil 18 is thick and/or contains a lot of clay, it may be necessary to direct less soil 18 onto the conveyor 14 to ensure that all soil 18 on the conveyor 14 achieves the target soil 18 temperature.

The conveyor 14 transports the soil 18 through a microwave energy application area where a plurality of microwave energy sources 10 emit a high density microwave charge into the soil 18 to heat the soil 18. The microwave energy is shown in FIG. 1 by arrows C. The microwave energy causes molecular cell damage to all weed, plant, and insect cells in the soil 18 thereby destroying these pests and sterilizing the soil 18. Preferably, there are at least two microwave energy sources 10 combined with the device. More preferably, there are at least ten microwave energy sources 10 combined with the device. After the soil 18 passes through the microwave energy application area, it is carried to the rear of the device by the conveyor 14 where the soil 18 is dispersed back onto the ground as shown by arrows B in FIGS. 1 and 2.

The conveyor 14 is preferably hydraulically driven, however, the conveyor 14 can be driven by any suitable means including by operative combination with an axle, wheel, or Power Take Off (PTO) from the primary mover vehicle 20. In an alternate embodiment the conveyor is powered by power generator 24. This power generator 24 may also power the microwave energy sources 10.

In one embodiment the device further comprises a temperature sensor 40 for determining the temperature of the soil 18 as it moves through the microwave energy application area and is heated by the microwave energy. This temperature sensor 40 for determining the soil 18 temperature could be a conventional thermometer, an infrared thermometer, or any other suitable device. This temperature is then communicated to the user so the user can determine whether the temperature needs to be increased or decreased.

Soil compositions may vary depending on the geographical region, temperature, and/or daily precipitation. Therefore, the present invention allows the user to vary the soil 18 temperature achieved in the microwave energy application area. One way to vary the temperature achieved by the soil 18 is to simply add (or activate) or remove (or deactivate) microwave energy sources 10 on the device. For example, if a device having twenty microwave energy devices 10 combined therewith is making the soil 18 too hot; simply deactivate several of the devices 10 until the soil 18 reaches the desired temperature. Conversely, if the soil 18 is not being heated up to the desired temperature, simply add or turn on more microwave energy devices 10 until the soil 18 is reaching the desired temperature.

Another way to vary the soil 18 temperature as it moves through the microwave energy application area is to change the frequency and wattage of the microwave energy being emitted by the microwave energy sources 10. One of ordinary skill in the art will recognize the proper frequency and wattage ranges necessary to heat various types of soil to desired pest destruction temperatures. Examples of such frequency and wattage ranges are given in U.S. patent application Ser. No. 10/245,787 published on Nov. 20, 2003, which is hereby incorporated by reference.

In addition to varying the frequency and power output of the microwave energy devices 10, the speed of the conveyor 14 may also be varied to change the soil 18 temperature achieved. In other words, a slower conveyor 14 speed causes the soil 18 to be exposed to the microwave radiation for a longer period of time, which would heat the soil 18 to a higher temperature. Preferably, the conveyor 14 is operated at the same speed as the ground speed of the primary mover vehicle 20 so that the soil 18 is evenly treated. Therefore, in the preferred embodiment, simply slowing the ground speed of the primary mover vehicle 20 would increase the temperature of the soil 18 as it passes through the microwave energy application area because the soil 18 would be exposed to the radiation for a longer period of time.

In the preferred embodiment it is necessary for the primary mover vehicle 20 to move at the same speed as the conveyor 14 because if the conveyor 14 speed was slower than the ground speed, an excessive amount of soil 18 may gather in front of the ground engaging member 12 so that not all soil 18 is directed onto the conveyor 14, i.e. the ground engaging member may plow some of the soil 18 instead of directing it up onto the conveyor 14. In order to ensure that the primary mover vehicle 20 and conveyor 14 are moving at the same speed, the device may include a sensor that governs the speed of the conveyor 14 to ensure the conveyor 14 speed is always the same as the ground speed.

In some embodiments of the invention, the device may comprise a hitch near its rear to combine with a planter or other farm implement device. In this embodiment, the soil 18 can be sterilized using the present invention and the crop can be planted with a planter in one pass of the primary mover vehicle 20 over the field.

In another embodiment of the invention, multiple microwave energy sterilization devices can be pulled behind a single primary mover vehicle 20. This embodiment helps to ensure that all soil 18 in the field is treated. The devices can be pulled in a staggered fashion so that a portion of each unit's path overlaps to ensure that all soil 18 is treated by the microwave energy. Preferably, three devices can be pulled behind a single primary mover vehicle 20 in a triangle fashion wherein the path of the rear two devices slightly overlap each side of the path created by the lead device to ensure that all soil 18 is treated by the microwave energy.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

The invention claimed is:

1. An apparatus capable of moving over a ground surface for treating soil by irradiation with microwave energy, said apparatus comprising:
   a frame having a front portion and a rear portion;
   a ground engaging element combined with the frame capable of rotation for moving the apparatus over the ground surface;
   a soil engaging member combined with the front portion of the frame, said soil engaging member having a first end and a second end wherein the first end extends a predetermined distance below the ground surface during operation so that movement of the apparatus across the ground surface causes the soil engaging member to penetrate under the ground surface and direct soil onto the soil engaging member;

a conveyor in proximity to the soil engaging member second end so the soil the soil engaging member is directed onto the conveyor;

at least one microwave energy device combined with the frame for emitting microwave energy toward the soil being carried by the conveyor; and a power source operatively combined with the microwave energy device for providing power to the microwave energy device;

a sensor mechanism for monitoring the rotational speed of the conveyor and the ground speed of the apparatus and changing the rotational speed of the conveyor to match the ground speed of the apparatus if the conveyor is moving at a speed different from the ground speed of the apparatus.

\* \* \* \* \*